US012729711B2

(12) United States Patent
Hua et al.

(10) Patent No.: US 12,729,711 B2
(45) Date of Patent: Sep. 8, 2026

(54) LOCKING STRUCTURE AND BUCKLING WASHER

(71) Applicant: PEGATRON CORPORATION, Taipei City (TW)

(72) Inventors: Ting-Xuan Hua, Taipei City (TW); Ming-Te Lin, Taipei City (TW); Chi-Ming Tsai, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 601 days.

(21) Appl. No.: 18/214,106

(22) Filed: Jun. 26, 2023

(65) Prior Publication Data

US 2024/0052874 A1 Feb. 15, 2024

(30) Foreign Application Priority Data

Aug. 12, 2022 (TW) ................................. 111130308

(51) Int. Cl.
*F16B 39/24* (2006.01)

(52) U.S. Cl.
CPC ................................... *F16B 39/24* (2013.01)

(58) Field of Classification Search
CPC .... F16B 39/24; F16B 5/0225; F16B 2200/93; F16B 43/00; F16B 41/005; F16B 5/02; F16B 35/00
See application file for complete search history.

(56) References Cited

U.S. PATENT DOCUMENTS 4,283,091 A * 8/1981 Enders .................... B60B 3/165 403/372
4,413,876 A * 11/1983 Borne .................. B25B 23/142 411/429
4,705,425 A 11/1987 Okawa
(Continued)

FOREIGN PATENT DOCUMENTS

CN 101998796 A 3/2011
CN 104853557 B 8/2017
(Continued)

OTHER PUBLICATIONS

European Patent Office, Search Report issued on Dec. 14, 2023 for EP application No. 23178680.7.

*Primary Examiner* — Truc T Nguyen
(74) *Attorney, Agent, or Firm* — Li & Cai Intellectual Property (USA) Office

(57) ABSTRACT

A locking structure and a buckling washer are provided. The locking structure is provided for locking an object having a thru-hole. The locking structure includes a stud sleeve, a buckling washer, and a screw. The buckling washer is disposed on the stud sleeve, and the buckling washer includes a carrying portion and a plurality of hook portions. The carrying portion has a penetrating hole, and the hook portions extend from the carrying portion and are arranged outside of the penetrating hole. The carrying portion of the buckling washer is configured to carry the object, and the hook portions are configured to retain the object. The screw is configured to be screwed in the stud sleeve by passing through the thru-hole of the object and the penetrating hole of the buckling washer, such that the object is locked by the hook portions.

10 Claims, 8 Drawing Sheets

(56) References Cited

U.S. PATENT DOCUMENTS

| | | | | |
|---|---|---|---|---|
| 5,658,108 | A * | 8/1997 | Swick | H01R 4/44 411/959 |
| 7,990,722 | B2 | 8/2011 | Cao et al. | |
| 9,271,062 | B2 | 2/2016 | Wu et al. | |
| 2006/0233627 | A1* | 10/2006 | Weinstein | F16J 15/3276 411/369 |
| 2010/0055959 | A1* | 3/2010 | Yeh | H05K 7/1061 439/331 |
| 2010/0087085 | A1* | 4/2010 | Liu | H01R 12/7047 439/353 |
| 2011/0038125 | A1* | 2/2011 | Cao | H10W 40/611 361/720 |
| 2011/0214976 | A1 | 9/2011 | Bloch | |
| 2021/0199151 | A1* | 7/2021 | Lin | F16B 39/22 |
| 2023/0204055 | A1* | 6/2023 | Chen | F16B 5/0233 411/368 |

FOREIGN PATENT DOCUMENTS

| | | | |
|---|---|---|---|
| DE | 202018104330 | U1 | 8/2018 |
| EP | 0897655 | B1 | 7/2000 |
| JP | 201532417 | A | 2/2015 |

* cited by examiner

LOCKING STRUCTURE AND BUCKLING WASHER

CROSS-REFERENCE TO RELATED PATENT APPLICATION

This application claims the benefit of priority to Taiwan Patent Application No. 111130308, filed on Aug. 12, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a washer, and more particularly to a buckling washer and a locking structure that uses a buckling washer.

BACKGROUND OF THE DISCLOSURE

A conventional washer cannot be used to fix in position an object that is disposed thereon, so that when the object is used to be fixed by the screw and the conventional washer, the screw often becomes slantingly engaged and cannot be assembled correctly.

SUMMARY OF THE DISCLOSURE

In response to the above-referenced technical inadequacies, the present disclosure provides a locking structure and a buckling washer to effectively improve on the issues associated with conventional washers.

In order to solve the above-mentioned problems, one of the technical aspects adopted by the present disclosure is to provide a locking structure being capable of locking an object having a thru-hole. The locking structure includes a stud sleeve, a buckling washer disposed on the stud sleeve, and a screw. The buckling washer includes a carrying portion and a plurality of hook portions. The carrying portion has a penetrating hole. The hook portions extend from the carrying portion and are arranged outside of the penetrating hole. The carrying portion of the buckling washer is configured to carry the object, and the hook portions are configured to retain the object. The screw is configured to be screwed in the stud sleeve by passing through the thru-hole of the object and the penetrating hole of the buckling washer for enabling the object to be locked by the hook portions.

In order to solve the above-mentioned problems, another one of the technical aspects adopted by the present disclosure is to provide a buckling washer, which includes a carrying portion and a plurality of hook portions. The carrying portion has a penetrating hole. The hook portions extend from the carrying portion and are arranged outside of the penetrating hole. The carrying portion is configured to carry an object, and the hook portions are configured to retain the object for enabling the object to be locked in position by the hook portions.

Therefore, in the locking structure provided by the present disclosure, the buckling washer is not only used to limit the movement of the object along the assembling direction and the fine adjustment plane, but also the buckling washer and the object are used to jointly limit the screw for preventing from being slanted relative to the assembling direction.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
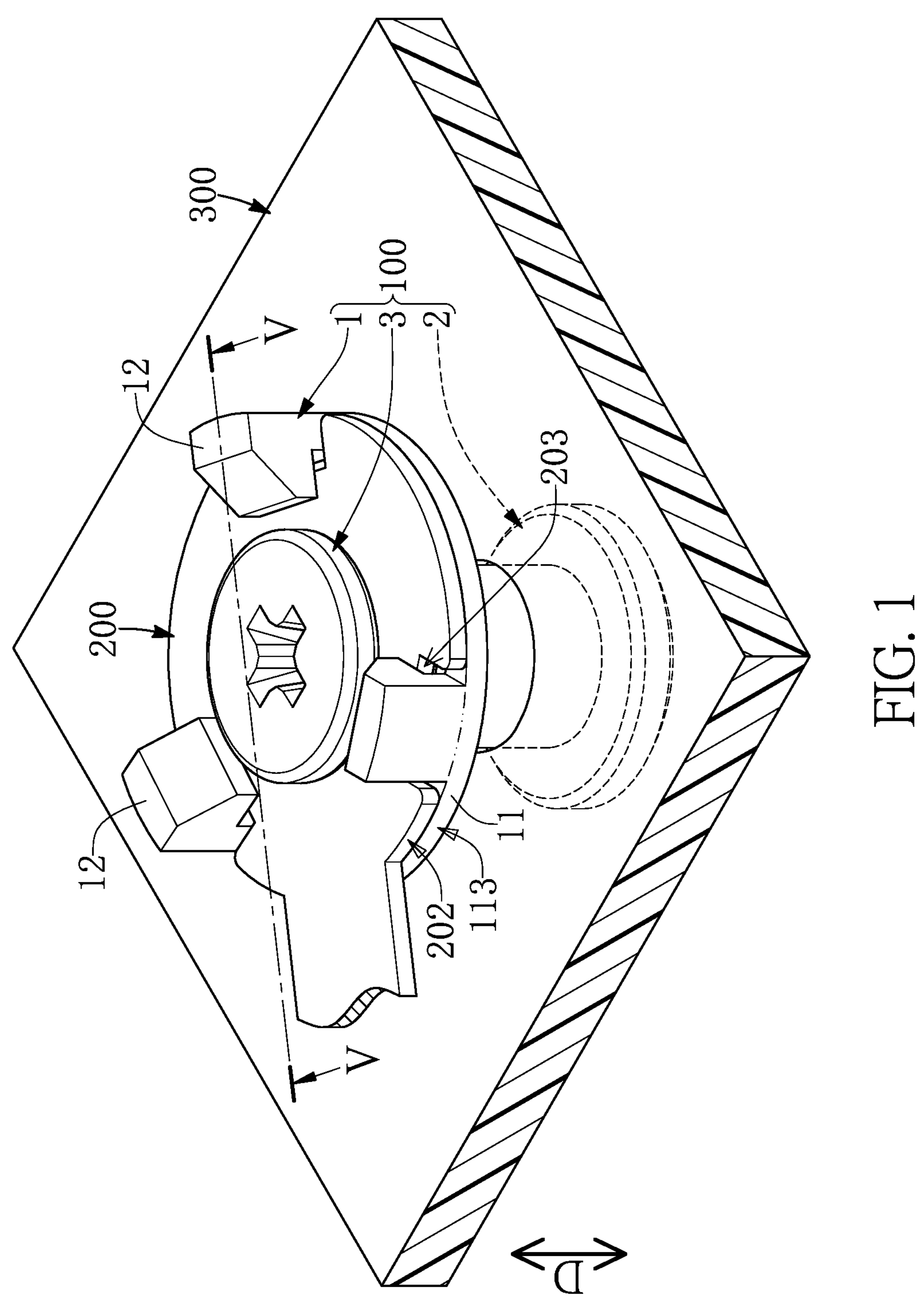
FIG. 1 is a schematic perspective view of a locking structure applied to a board and used to lock an object according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
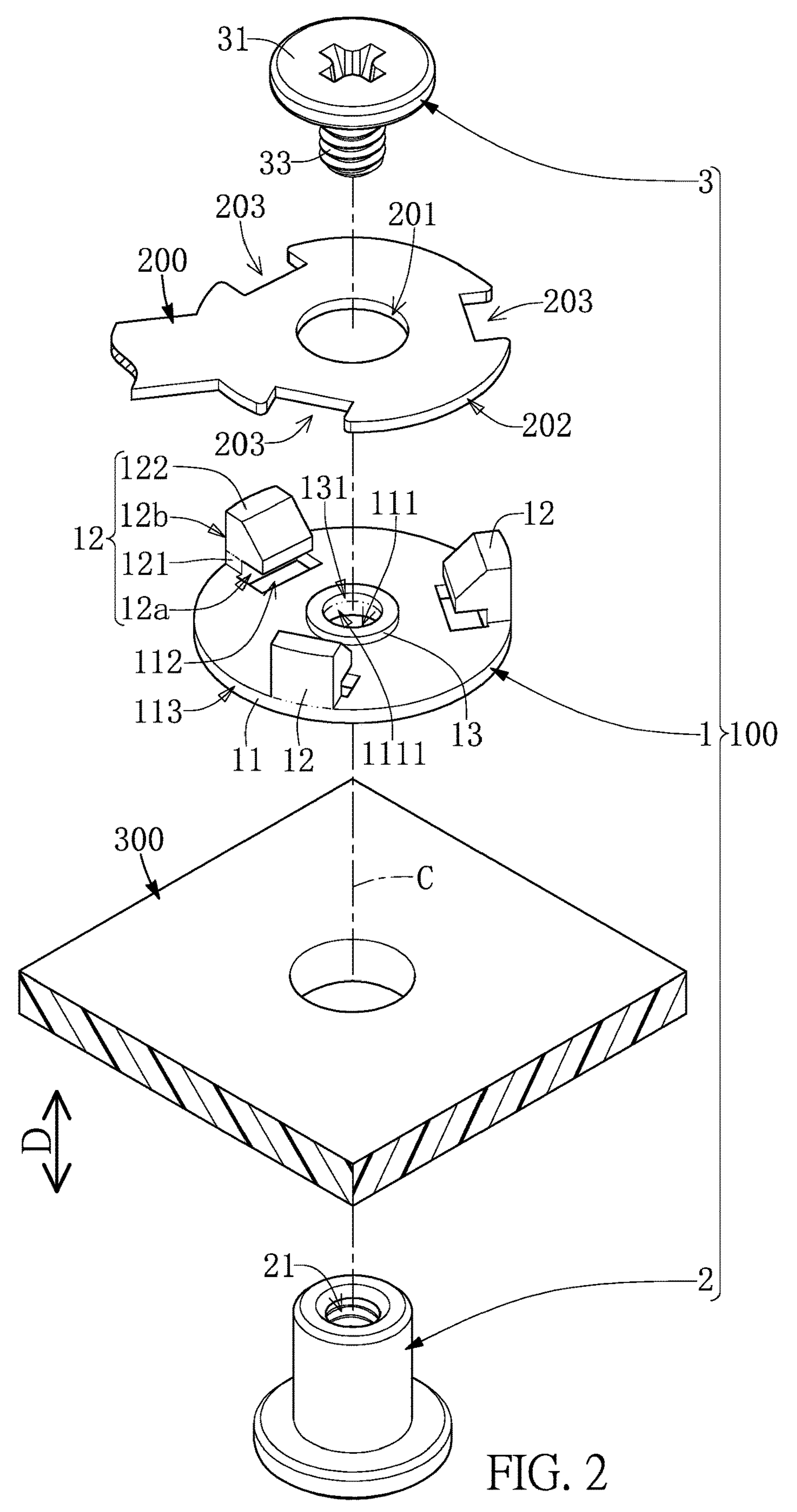
FIG. 2 is a schematic exploded view of FIG. 1.
Figure 3:
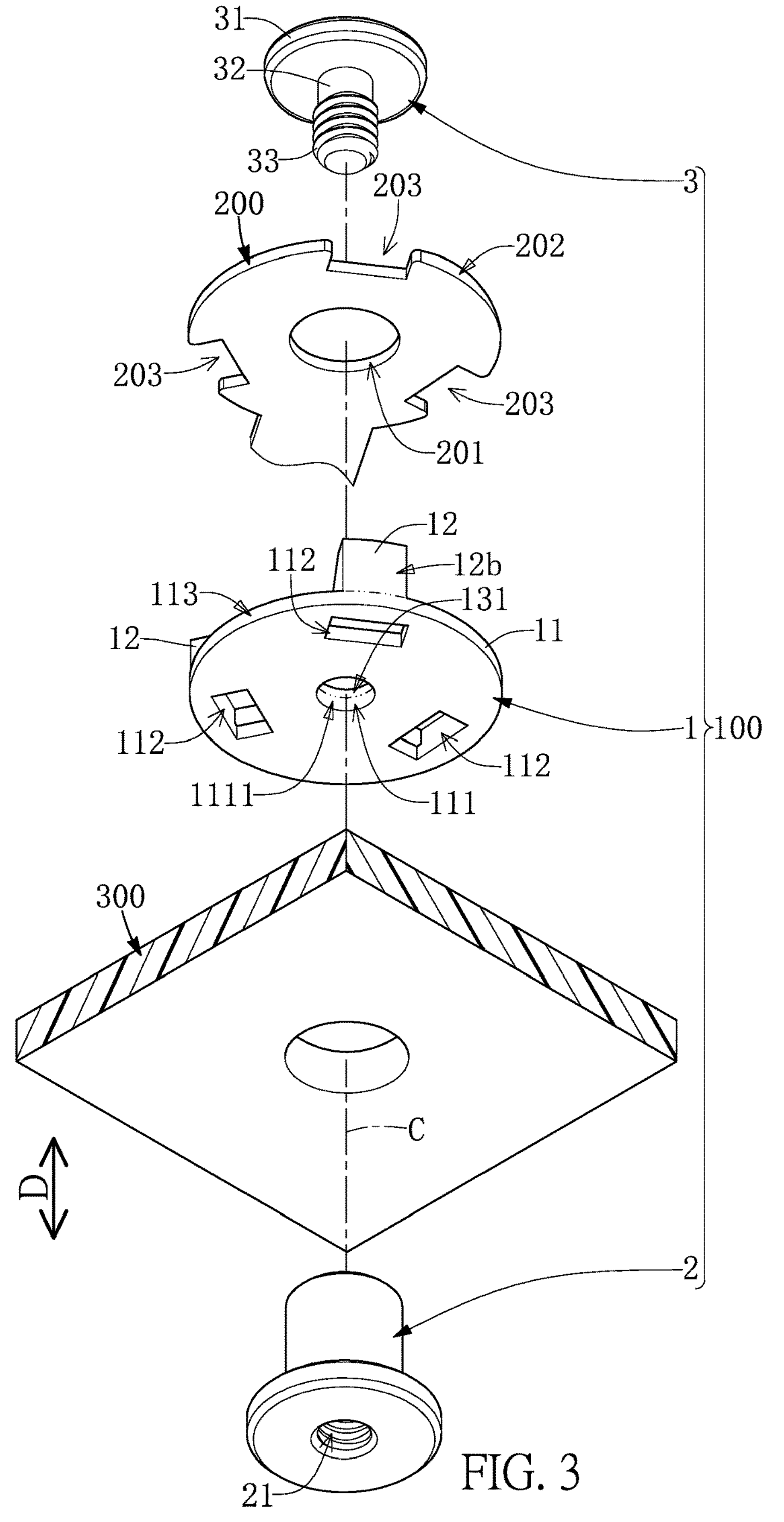
FIG. 3 is a schematic exploded view of FIG. 1 from another angle of view.
Figure 4:
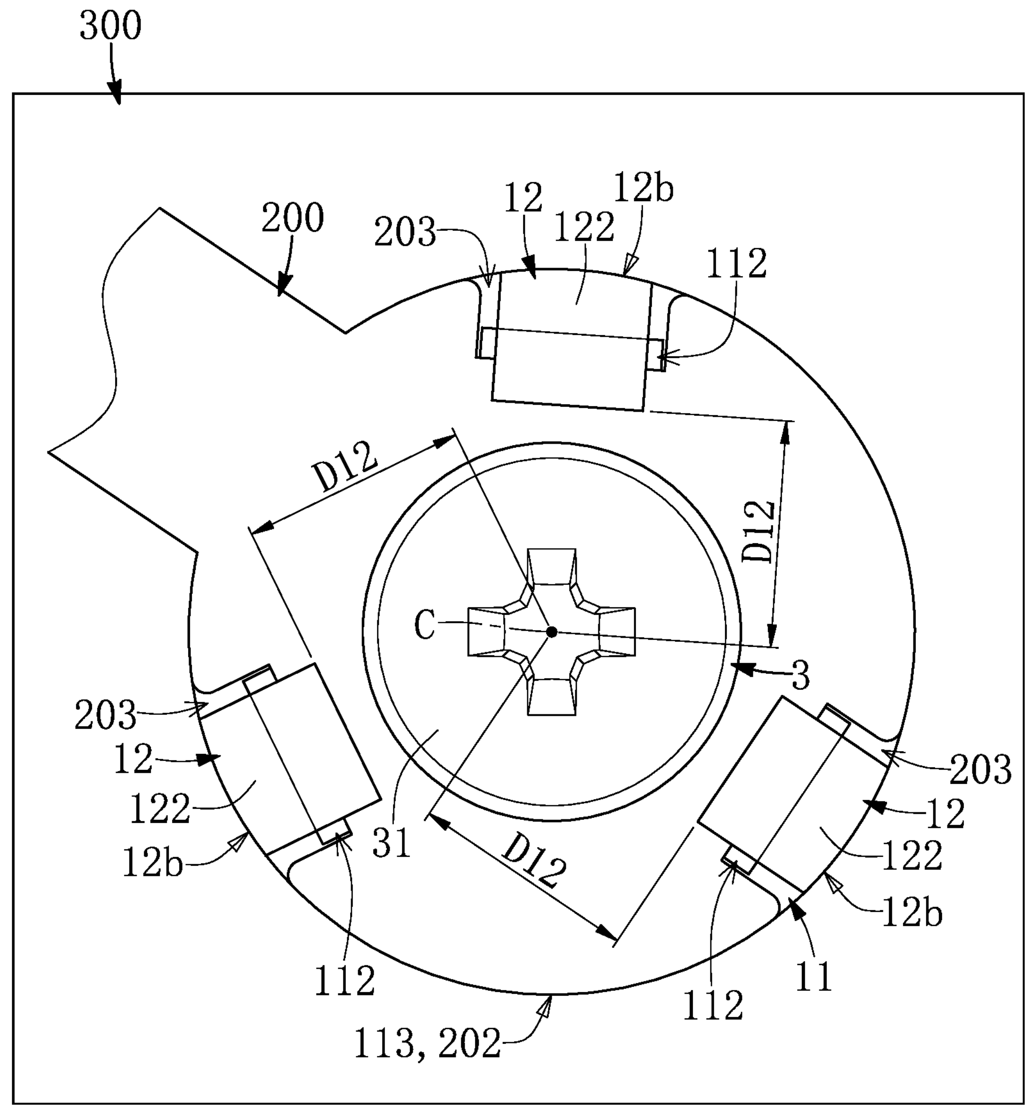
FIG. 4 is a schematic top view of FIG. 1.
Figure 5:
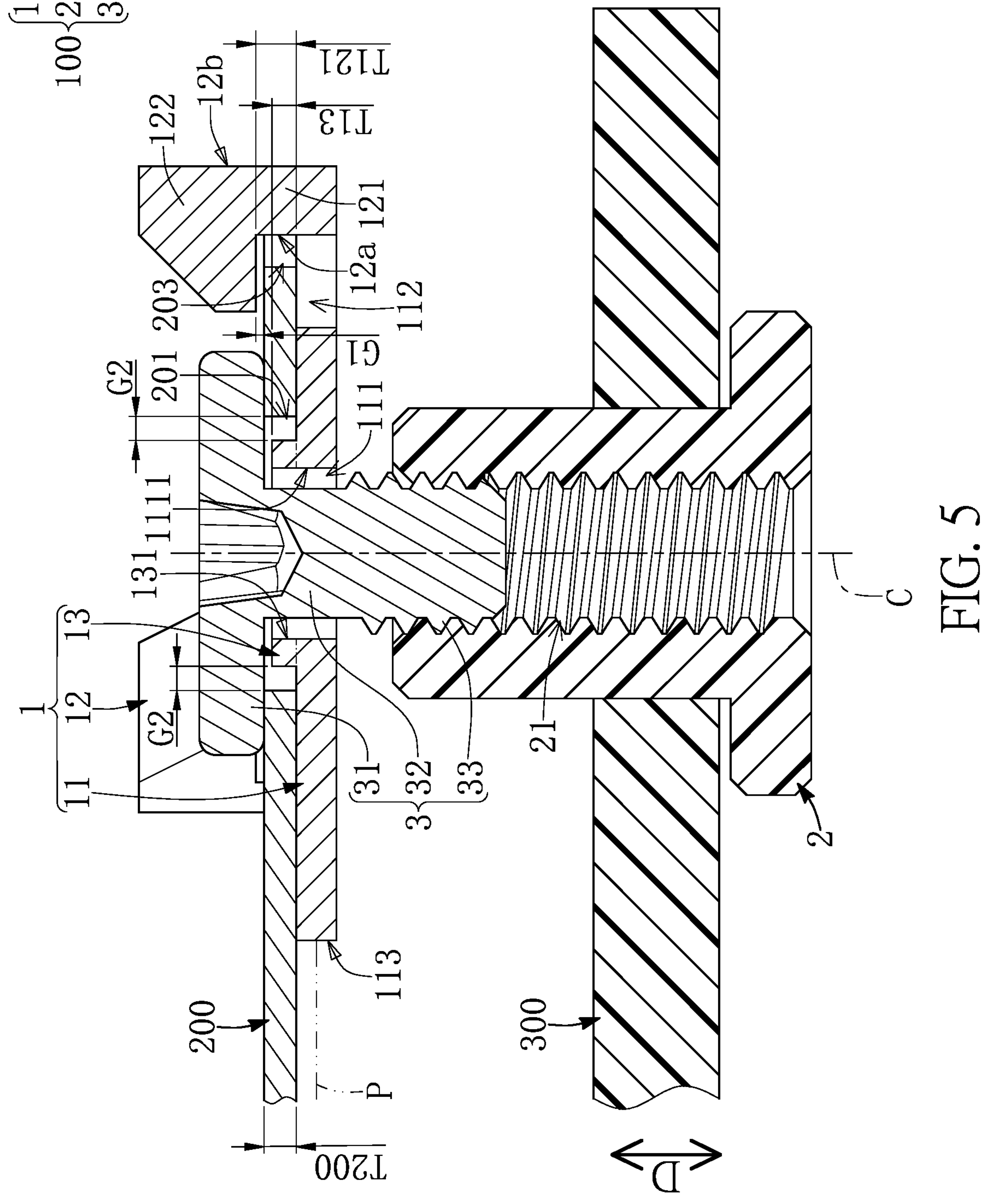
FIG. 5 is a schematic cross-sectional view taken along line V-V of FIG. 1.

Referring to FIG. 1 to FIG. 8, an embodiment of the present disclosure is provided. As shown in FIG. 1 to FIG. 3, the present embodiment provides a locking structure 100 being applied to a board 300 (e.g., a circuit board) and being capable of locking an object 200 having a thru-hole 201. An portion of the object 200 in the present embodiment substantially has a circular shape, the thru-hole 201 is substantially located at a center of circle of the portion, and the object 200 has a plurality of notches 203 recessed in an edge 202 of the portion. In addition, in other embodiments of the present disclosure not shown in the drawings, the board 300 can be provided with a plurality of the locking structures 100, and the locking structures 100 are jointly used to lock the same object.

As shown in FIG. 2 to FIG. 5, the locking structure 100 in the present embodiment includes a stud sleeve 2 assembled to the board 300, a buckling washer 1 disposed on the stud sleeve 2, and a screw 3 that is configured to screw the buckling washer 1 onto the stud sleeve 2. The stud sleeve 2 can be fixed to the board 300 by passing through the board 300 from a bottom side thereof, and the stud sleeve 2 has an internal thread channel 21 formed in an interior thereof along an assembling direction D. The assembling direction D in the present embodiment is substantially perpendicular to the board 300, but the present disclosure is not limited thereto.

It should be noted that the buckling washer 1 in the present embodiment is described in cooperation with the stud sleeve 2 and the screw 3, but the present disclosure is not limited thereto. For example, in other embodiments of the present disclosure not shown in the drawings, the buckling washer 1 can be independently used (e.g., sold) or can be used in cooperation with other components.

In the present embodiment, the buckling washer 1 is integrally formed as a single one-piece structure, and the buckling washer 1 includes a carrying portion 11 having a penetrating hole 111, a plurality of hook portions 12 extending from the carrying portion 11, and a limiting portion 13 that has a ring shape and that extends from the carrying portion 11 (e.g., the limiting portion 13 extends from a peripheral edge of the penetrating hole 111), but the present disclosure is not limited thereto. For example, in other embodiments of the present disclosure not shown in the drawings, the buckling washer 1 can be a non-integrally formed structure; or, the limiting portion 13 can be omitted or can be a non-annular structure.

Specifically, the carrying portion 11 has a plurality of openings 112 arranged outside of the penetrating hole 111 and respectively corresponding in position to the hook portions 12. The carrying portion 11 in the present embodiment is a circular plate, and the penetrating hole 111 is located at a center of circle of the carrying portion 11. In other words, the carrying portion 11 can define a central axis C passing through a center of the penetrating hole 111, and each of the openings 112 is spaced apart from the central axis C by a same distance.

The hook portions 12 are connected to a same surface of the carrying portion 11 (e.g., a top surface of the carrying portion 11 shown in FIG. 2) and are arranged outside of the penetrating hole 111, and each of the hook portions 12 is spaced apart from the central axis C by a same distance D12. The hook portions 12 are respectively arranged adjacent to the openings 112, an inner side 12*a* of each of the hook portions 12 is flush with an inner wall defining an adjacent one of the openings 112, and an outer side 12*b* of each of the hook portions 12 is flush with a surrounding lateral edge 113 of the carrying portion 11. In other words, each of the hook portions 12 is connected to an area of the carrying portion 11 between the surrounding lateral edge 113 and an adjacent one of the openings 112.

Moreover, a quantity of the hook portions 12 is defined as N, which is a positive integer greater than one, and the buckling washer 1 preferably has an N-fold rotational symmetry with respect to the central axis C. In the present embodiment, N is three, and the structure of each of the hook portions 12 is substantially the same. The following description discloses the structure of one of the hook portions 12 for the sake of brevity, but the present disclosure is not limited thereto. For example, in other embodiments of the present disclosure not shown in the drawings, the hook portions 12 may be have different structures.

In the present embodiment, the hook portion 12 has an upright segment 121 connected to the carrying portion 11 and a buckling segment 122 that is connected to the upright segment 121. In other words, an end of the upright segment 121 is connected to the surrounding lateral edge 113 of the carrying portion 11, another end of the upright segment 121 is connected to the buckling segment 122, and a part of the buckling segment is located above an adjacent one of the openings 112, but the present disclosure is not limited thereto.

Moreover, along the assembling direction D, a height T121 of the upright segment 121 is substantially greater than or equal to a thickness T200 of the object 200, and is greater than a height T13 of the limiting portion 13. The height T13 of the limiting portion 13 is preferably less than the thickness T200 of the object 200. The limiting portion 13 has a ring shape, an inner surface 131 of the limiting portion 13 is flush with a wall 1111 defining by the penetrating hole 111 of the carrying portion 11, and an outer diameter of the limiting portion 13 is slightly less than an inner diameter of the thru-hole 201 of the object 200.

Specifically, the carrying portion 11 of the buckling washer 1 is configured to carry the object 200, and the hook portions 12 (e.g., the buckling segments 122) are configured to retain the object 200 for enabling the object 200 to be locked by the hook portions 12. Accordingly, the buckling washer 1 is used to limit the movement of the object 200 along the assembling direction D and a fine adjustment plane P that is perpendicular to the assembling direction D.

Figure 6:
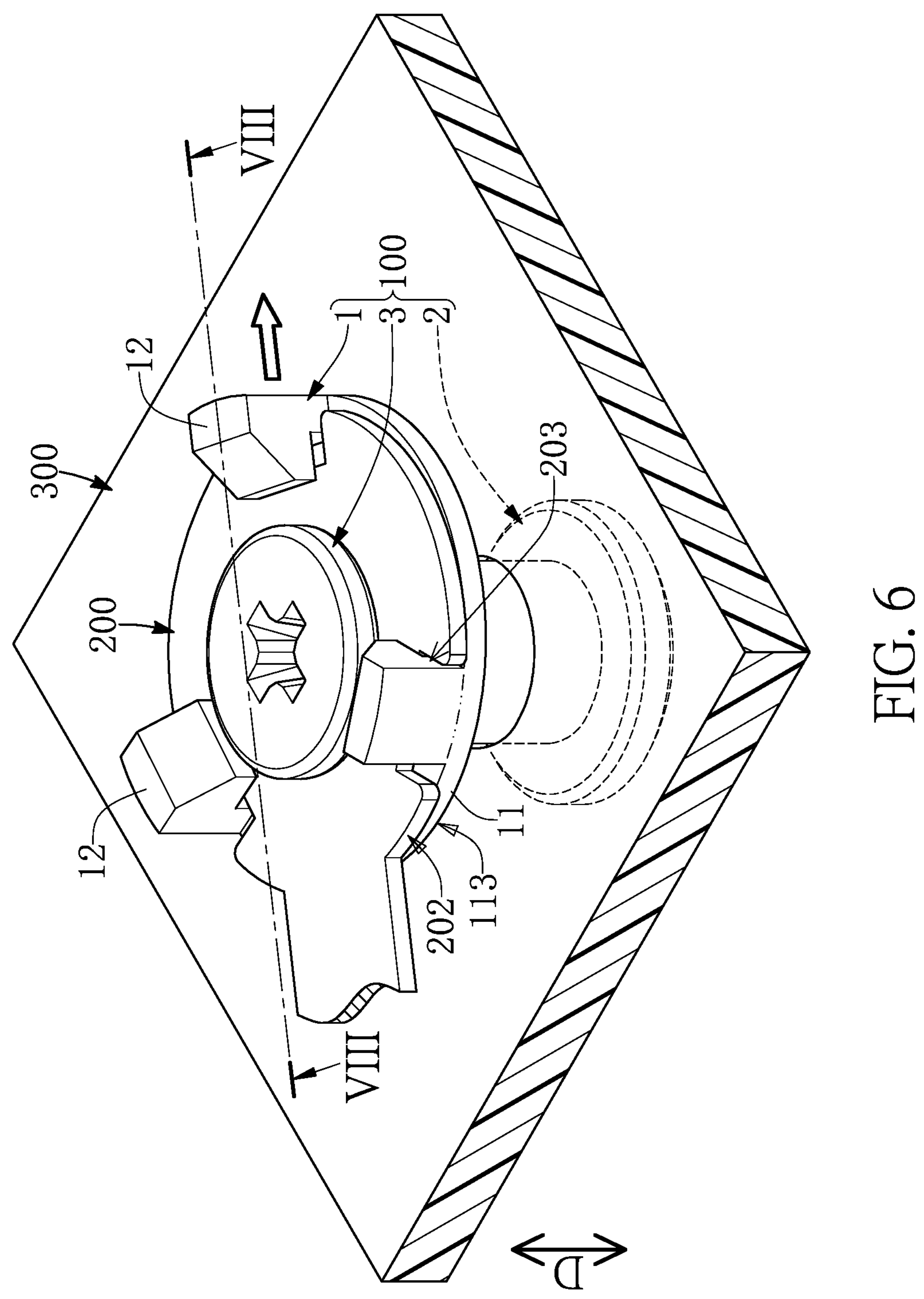
FIG. 6 is a schematic perspective view showing a buckling washer of FIG. 1 moved relative to the object.
Figure 7:
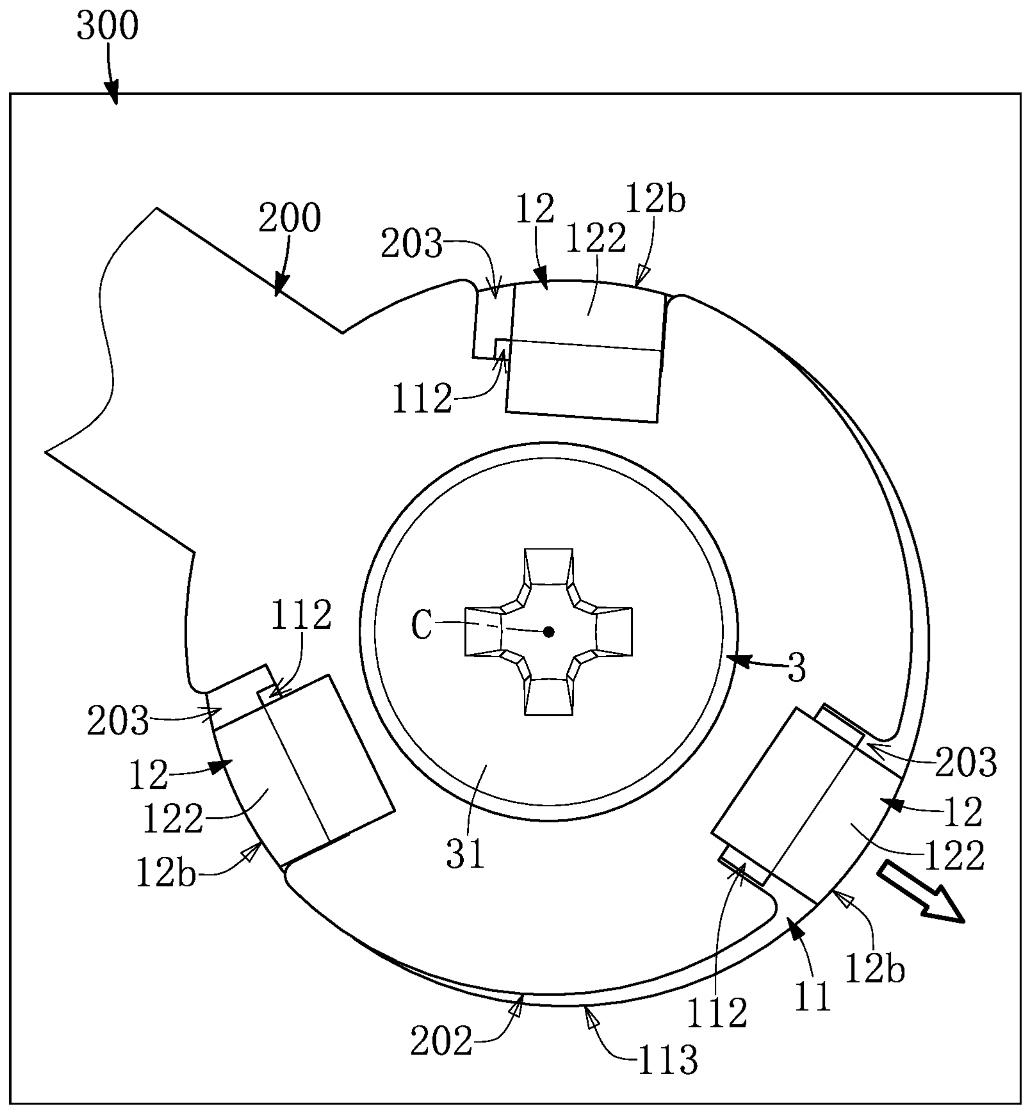
FIG. 7 is a schematic top view of FIG. 6.
Figure 8:
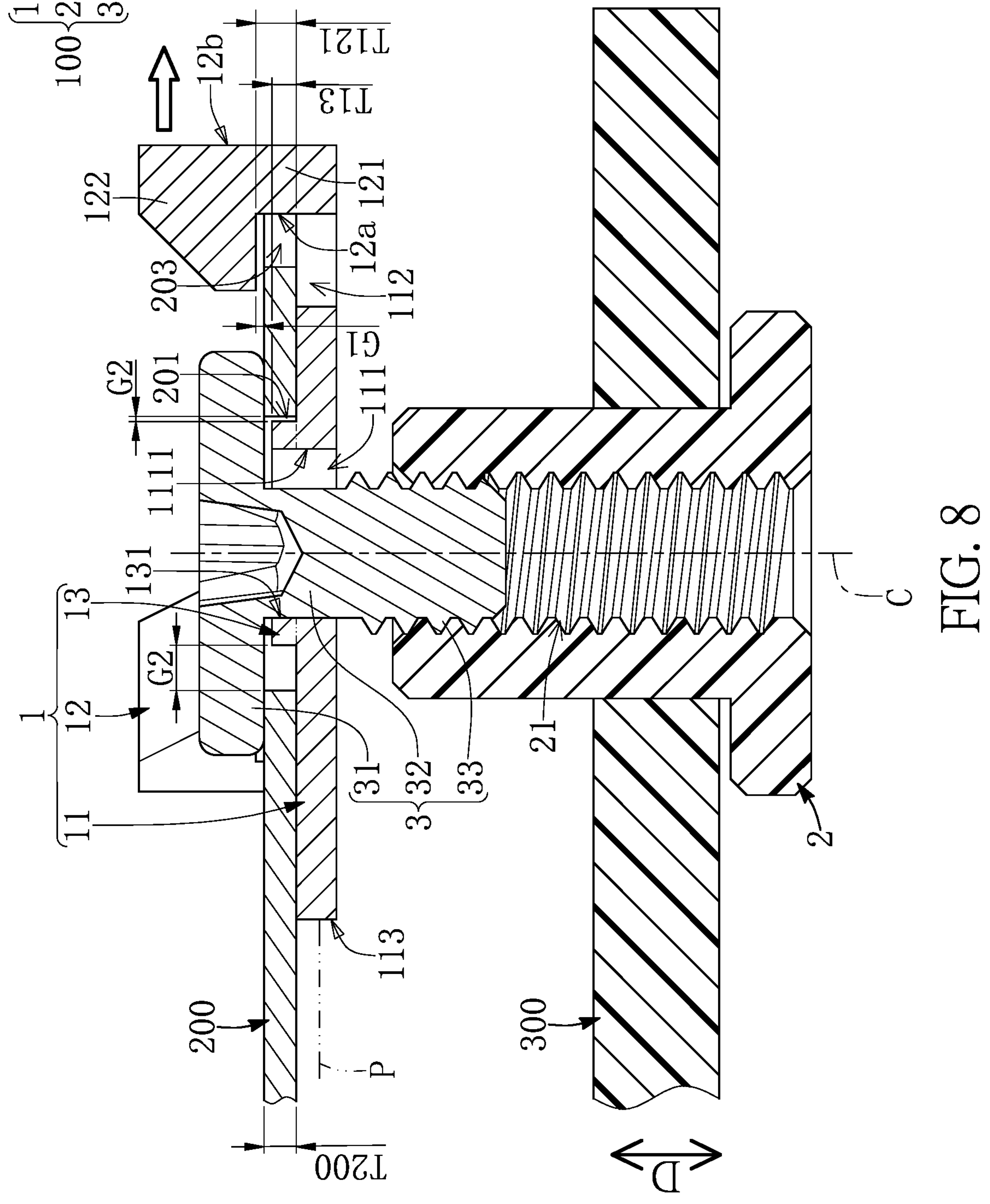
FIG. 8 is a schematic cross-sectional view taken along line VIII-VIII of FIG. 6.

The buckling segments 122 of the hook portions 12 are configured to respectively correspond in position to the notches 203 of the object 200. Along the assembling direction D, the object 200 and any one of the hook portions 12 (e.g., the buckling segment 122) have a longitudinal gap G1 therebetween. Moreover, the limiting portion 13 of the buckling washer 1 is extended into the thru-hole 201 of the object 200, and the limiting portion 13 and the thru-hole 201 have a transverse gap G2 therebetween in the fine adjustment plane P, so that the buckling washer 1 is movable relative to the object 200 along the fine adjustment plane P (as shown in FIG. 6 to FIG. 8). For example, as shown in FIG. 8, the buckling washer 1 can be slightly moved relative to the object 200 toward a right side, such that a right area of the transverse gap G2 is reduced, and a left area of the transverse gap G2 is expanded.

The screw 3 is configured to be screwed in the stud sleeve 2 by passing through the thru-hole 201 of the object 200 and the penetrating hole 111 of the buckling washer 1 for enabling the object 200 to be locked by the hook portions 12. Accordingly, the buckling washer 1 is not only limit the movement of the object 200 along the assembling direction D and the fine adjustment plane P, but also the bucking washer 1 and the object 200 are used to jointly limit the screw 3 for preventing from being slanted relative to the assembling direction D.

Specifically, the screw 3 in the present embodiment has a head portion 31 provided for operation, a shaft portion 32 extending from the head portion 31, and a thread portion 33 that extends from the shaft portion 32. An outer diameter of the head portion 31 is greater than an outer diameter of the thread portion 33, and the outer diameter of the thread portion 33 is greater than an outer diameter of the shaft portion 32.

Moreover, the head portion 31 is located in a space surroundingly defined by the hook portions 12, and the head portion 31 and the carrying portion 11 are configured to jointly clamp the object 200 along the assembling direction D. Specifically, the thread portion 31 is threaded in the stud sleeve 2 along the assembling direction D, and the shaft portion 32 passes through the thru-hole 201 and the penetrating hole 111, so that the buckling washer 1 is movable relative to the object 200 along the fine adjustment plane P (as shown in FIG. 6 to FIG. 8).

Beneficial Effects of the Embodiments

In conclusion, in the locking structure provided by the present disclosure, the buckling washer is not only used to limit the movement of the object along the assembling direction and the fine adjustment plane, but also the buckling washer and the object are used to jointly limit the screw for preventing from having an oblique relative to the assembling direction.

Specifically, in the locking structure provided by the present disclosure, the buckling washer can be moved and fine-tuned along the fine adjustment plane, thereby effectively being corrected and reducing offset. Moreover, the buckling washer can be sleeved on the shaft portion of the screw through the limiting portion for further generating a limitation to the screw, thereby preventing the screw from having an oblique relative to the assembling direction.

In the locking structure provided by the present disclosure, the performance of the buckling washer can be further increased through structural designs (e.g., the buckling washer having an N-fold rotational symmetry with respect to the central axis, the object and any one of the hook portions having the longitudinal gap therebetween along the assembling direction, or the limiting portion and the thru-hole having the transverse gap therebetween on the fine adjustment plane).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A locking structure being capable of locking an object having a thru-hole, the locking structure comprising:

a stud sleeve;

a buckling washer disposed on the stud sleeve and including:

a carrying portion having a penetrating hole; and a plurality of hook portions extending from the carrying portion and arranged outside of the penetrating hole, wherein the carrying portion of the buckling washer is configured to carry the object, and the hook portions are configured to retain the object; and a screw that is configured to be screwed in the stud sleeve along an assembling direction by passing through the thru-hole of the object and the penetrating hole of the buckling washer for enabling the object to be locked by the hook portions and the buckling washer is movable relative to the object along a fine adjustment plane perpendicular to the assembling direction.

2. The locking structure according to claim 1, wherein the buckling washer has a limiting portion having a ring shape and extending from a peripheral edge of the penetrating hole, and the limiting portion is configured to extend into the thru-hole of the object.

3. The locking structure according to claim 2, wherein an inner surface of the limiting portion is flush with a wall defining by the penetrating hole of the carrying portion, and a transverse gap is formed between the limiting portion and the thru-hole as the limiting portion is extended into the thru-hole of the object.

4. The locking structure according to claim 2, wherein each of the hook portions includes:

an upright segment having an end that is connected to a surrounding lateral edge of the carrying portion, wherein a height of the upright segment is configured to be greater than or equal to a thickness of the object; and a buckling segment connected to another end of the upright segment and configured to retain the object.

5. The locking structure according to claim 4, wherein a plurality of notches are recessed in an edge of the object, and the buckling segment of the hook portions are configured to respectively correspond in position to the notches.

6. The locking structure according to claim 1, wherein the screw has a head portion, a shaft portion extending from the head portion, and a thread portion that extends from the shaft portion, wherein the head portion and the carrying portion are configured to jointly clamp the object, and the thread portion is threaded in the stud sleeve along the assembling direction, and wherein the shaft portion is configured to pass through the thru-hole and the penetrating hole.

7. The locking structure according to claim 6, wherein the head portion is located in a space surroundingly defined by the hook portions, and a longitudinal gap is formed between the object and any one of the hook portions as the object is retained by the hook portions.

8. The locking structure according to claim 1, wherein the carrying portion defines a central axis passing through a center of the penetrating hole, and each of the hook portions is spaced apart from the central axis by a same distance.

9. The locking structure according to claim 1, wherein the carrying portion defines a central axis passing through a center of the penetrating hole, a quantity of the hook portions is N, where N is a positive integer greater than one, and the buckling washer has an N-fold rotational symmetry with respect to the central axis.

10. The locking structure according to claim 1, wherein the buckling washer is integrally formed as a single one-piece structure.

* * * * *